US011167999B2

(12) United States Patent
Kotov et al.

(10) Patent No.: US 11,167,999 B2
(45) Date of Patent: Nov. 9, 2021

(54) BIOMIMETIC COMPOSITE MATERIALS FOR VIBRATION ISOLATION

(71) Applicant: The Regents of the University of Michigan, Ann Arbor, MI (US)

(72) Inventors: Nicholas A. Kotov, Ypsilanti, MI (US); Bongjun Yeom, Seoul (KR)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 105 days.

(21) Appl. No.: 16/283,231

(22) Filed: Feb. 22, 2019

(65) Prior Publication Data

US 2019/0256369 A1 Aug. 22, 2019

Related U.S. Application Data

(60) Provisional application No. 62/633,987, filed on Feb. 22, 2018.

(51) Int. Cl.
*H01B 1/20* (2006.01)
*C01G 9/02* (2006.01)
(Continued)

(52) U.S. Cl.
CPC .............. *C01G 9/02* (2013.01); *C08L 101/12* (2013.01); *H01B 1/20* (2013.01); *B82Y 40/00* (2013.01);
(Continued)

(58) Field of Classification Search
CPC ... H01B 1/00; H01B 1/20; H01B 1/22; C01G 9/02; C08K 3/013; C08K 7/04; C08K 2201/004; C08K 2201/011
See application file for complete search history.

(56) References Cited

U.S. PATENT DOCUMENTS 4,681,816 A * 7/1987 Hashimoto ............. B32B 15/08
428/463
5,164,260 A * 11/1992 Yoshinaka ............... C08K 7/08
428/328
(Continued)

FOREIGN PATENT DOCUMENTS

WO 2017117376 A1 7/2017

OTHER PUBLICATIONS

Lan et al "Facile and controllable synthesis of polyoxometalate nanorods within polyelectrolyte matrix", Journal of Colloid and Interface Science 316 (2007) 893-896.*
(Continued)

*Primary Examiner* — Mark Kopec
(74) *Attorney, Agent, or Firm* — Harness, Dickey & Pierce, P.L.C.

(57) ABSTRACT

The present disclosure provides a biomimetic composite that includes a plurality of nanostructures each having at least one axial geometry region comprising an inorganic material. The nanostructures may be a plurality of substantially aligned (e.g., in a vertical orientation) axial geometry nanowires comprising zinc oxide or alternatively hedgehog-shaped nanoparticles with needles comprising zinc oxide. A polymeric matrix disposed in void regions defined between respective nanostructures of the plurality of nanostructures. The biomimetic composite exhibits a viscoelastic figure of merit (VFOM) of greater than or equal to about 0.001 up to about 0.6 or greater. Methods of making such biomimetic composites are also provided.

13 Claims, 8 Drawing Sheets

(51) Int. Cl.
*C08L 101/12* (2006.01)
*B82Y 40/00* (2011.01)
*C08L 33/08* (2006.01)
*C08L 61/06* (2006.01)
*C08L 63/00* (2006.01)
*C08L 75/04* (2006.01)

(52) U.S. Cl.
CPC ...... *C01P 2004/16* (2013.01); *C01P 2006/40* (2013.01); *C08L 33/08* (2013.01); *C08L 61/06* (2013.01); *C08L 63/00* (2013.01); *C08L 75/04* (2013.01)

(56) References Cited

U.S. PATENT DOCUMENTS

| | | | |
|---|---|---|---|
| 9,447,251 B2* | 9/2016 | Lettow | C08K 3/013 |
| 9,694,518 B2 | 7/2017 | Kotov et al. | |
| 9,922,746 B2 | 3/2018 | Kotov et al. | |
| 10,160,833 B2 | 12/2018 | Kotov et al. | |
| 10,795,186 B2* | 10/2020 | Kotov | C08J 5/12 |
| 2005/0215703 A1* | 9/2005 | Mukasa | C08K 3/013 |
| | | | 524/601 |
| 2017/0313856 A1* | 11/2017 | Oda | C08K 5/435 |
| 2018/0174699 A1 | 6/2018 | Kotov et al. | |

OTHER PUBLICATIONS

Malakooti et al "Morphology-controlled ZnO nanowire arrays for tailored hybrid composites with high damping", ACS Appl. Mater. Interfaces 2015, 7, 332-339.*

Li, Zhou et al., "Cellular Level Biocompatibility and Biosafety of ZnO Nanowires," J. Phys. Chem. C, 112 (51) pp. 20114-20117; doi: 10.1021/jp808878p (Published online Nov. 26, 2008).

Ryou, Heonjune et al., "Nanoscopic dynamic mechanical properties of intertubular and peritubular dentin," Journal of the Mechanical Behavior of Biomedical Materials 7, pp. 3-16; doi: 10.1016/j.jmbbm. 2011.08.010 (Published online Sep. 7, 2011).

Wang, Y.C. et al., "Deformation of extreme viscoelastic metals and composites," Materials Science and Engineering A 370 (2004), pp. 41-49; doi:10.1016/j.msea.2003.08.071.

Yeom, Bongjun et al., "Abiotic tooth enamel," Nature 543, pp. 95-98; doi:10.1038/nature21410 (Published Mar. 1, 2017).

* cited by examiner

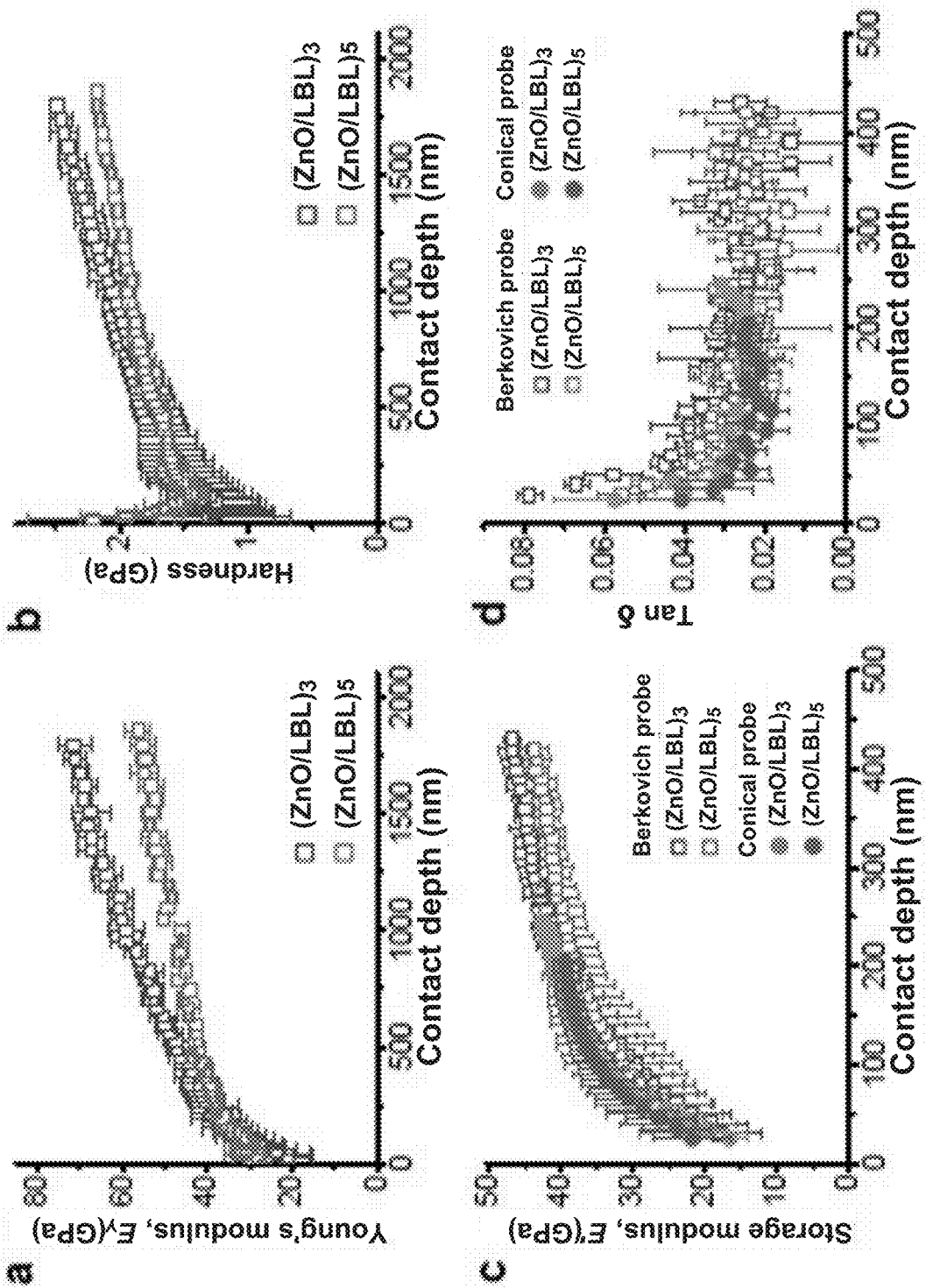
Figures 6A—6D

BIOMIMETIC COMPOSITE MATERIALS FOR VIBRATION ISOLATION

CROSS-REFERENCE TO RELATED APPLICATIONS

This application claims the benefit of U.S. Provisional Application No. 62/633,987 filed on Feb. 22, 2018. The entire disclosure of the above application is incorporated herein by reference.

GOVERNMENT SUPPORT

This invention was made with government support under Contract No. HR0011-10-C-0192 awarded by the U.S. Department of Defense/Defense Advanced Research Projects Agency and Grant Nos. ECS0601345, CBET0933384, CBET0932823, and CBET1036672 awarded by the National Science Foundation. The Government has certain rights in the invention.

FIELD

The present disclosure relates to abiotic materials that are biomimetic (for example, abiotic tooth enamel like structures) and capable of providing dampening or insulating properties from external damage, shock, and vibration for use in various devices and applications.

BACKGROUND

This section provides background information related to the present disclosure which is not necessarily prior art.

Living organisms have evolved to produce biocomposite materials that often outperform man-made materials. One of the most well-known examples is nacre, produced by the abalone mollusk (*Halions rufescens*), showing high toughness with a laminar organization. Columnar biocomposites, which have a hard inorganic phase organized as monocrystalline wires, columns and prisms, are also found in living creatures where tooth enamel and similar organs are the best examples. For example, tooth enamel comprises parallel microscale and nanoscale ceramic columns/prisms interlaced within a soft protein matrix. This structural motif is unusually consistent across all species from all geological eras. Interestingly, while the structure of bones, exoskeletons, carapaces, and other load bearing organs varies tremendously, tooth enamel shows striking consistency of the material design. The preference for columnar organization in this biomaterial can be seen across all habitats, species, and evolutionary epochs. Little variance in its structure can be exemplified by the tooth enamel in sea urchin, primates, dinosaurs, and modern and ancient walruses, as well as in similar organs in many other living creatures, e.g. the beak of the common octopus.

The columnar architecture in tooth enamel is indicative of its functional advantages. The special mechanical properties of tooth enamel, potentially combined with other properties afforded by similar materials architectures such as ion transport, or vibration damping, may present evolutionary advantages as well as technological value. However the columnar motif is hardly seen in artificial composites due to fundamental difficulties in preparation of synthetic biomimetic materials that might replicate such materials. For example, forming materials exhibiting combinations of high stiffness, damping, and light-weight have been inaccessible. It would be desirable to find successful methods of forming such biomimetic nanocomposites, which can have vast applicability in numerous applications, including for stiff load bearing components that can concurrently insulate vibration sensitive components from external damage, shock, and vibrational fatigues.

SUMMARY

This section provides a general summary of the disclosure, and is not a comprehensive disclosure of its full scope or all of its features.

In various aspects, the present disclosure provides a biomimetic composite that is capable of use as a vibration isolation material. The biomimetic composite comprises a plurality of nanostructures each having at least one axial geometry region comprising an inorganic material. The biomimetic composite also comprises a polymeric matrix disposed in void regions defined between respective nanostructures of the plurality of nanostructures. The biomimetic composite optionally exhibits a viscoelastic figure of merit (VFOM) of greater than or equal to about 0.001.

In one aspect, the plurality of nanostructures comprises a plurality of substantially aligned axial geometry nanowires comprising zinc oxide.

In one aspect, the plurality of substantially aligned axial geometry nanowires is substantially aligned in a vertical orientation with respect to a major plane of a substrate.

In one aspect, each nanowire of the plurality of substantially aligned axial geometry nanowires has an average height of greater than or equal to about 100 nm to less than or equal to about 10 µm and an average diameter of greater than or equal to about 50 nm to less than or equal to about 600 nm.

In one aspect, the plurality of nanostructures comprises a plurality of hedgehog-shaped microparticles comprising a polymeric core region and the at least one axial geometry region comprises a plurality of needles comprising zinc oxide.

In one aspect, the polymeric matrix comprises a polymer selected from the group consisting of: polyelectrolytes, phenolic resins, epoxy resins, acrylic resins, urethane resins, derivatives, copolymers, and combinations thereof.

In one aspect, the polymeric matrix comprises one or more polyelectrolytes selected from the group consisting of: poly(allylamine), poly(acrylic acid), poly(diallyldimethylammonium chloride), polyethyleneimine, and polystyrene sulfonate.

In one aspect, the polymeric matrix comprises at least two distinct polyelectrolytes.

In one aspect, a device incorporates the biomimetic composite, which is used as a vibration isolation support component.

In one aspect, a thickness of the biomimetic composite is greater than or equal to about 1 micrometer (µm) to less than or equal to about 1 millimeter (m).

In one aspect, the biomimetic composite has a Young's modulus (E) greater than or equal to about 30 GPa.

In one aspect, the biomimetic composite has a storage modulus (E') greater than or equal to about 25 GPa.

In one aspect, a device incorporates the biomimetic composite and the device is selected from the group consisting of: a biomedical implant, a vehicle, an aircraft, an automobile, safety armor, a shield, a building component, an electronic device, a photonic device, an optic device, an optoelectronic device, a magnetooptic device, an energy storage device, an electronic sensor, a transducer, and combinations thereof.

In one aspect, a device incorporates the biomimetic composite and the device is selected from the group consisting of: a processor, a motherboard, a memory chip, a solid state-laser, on optical element, a beam steering device, a beam splitter, a diffraction grating, an interferometer, a photodetector, a secondary battery, a structural battery, a supercapacitor, a condensator, a memristor, a magnetooptical memory cell, a hard drive, a current sensor, a voltage sensor, an electroscope, an electron multiplier, a microelectromechanical (MEMS) based sensor, and a piezoelectric sensor.

In various aspects, the present disclosure provides a method of making a biomimetic composite. The method may comprise applying a first charged material having a first polarity to a substrate having a plurality of nanostructures comprising zinc oxide having a second polarity opposite to the first polarity. The method may also comprise applying a second charged material having the second polarity over the first charged material in a layer-by-layer process. The first charged material and the second charged material each comprise a polymer distinct from one another. The applying of the first charged material and the second charged material forms a polymeric matrix around the plurality of nanostructures to form a biomimetic composite that exhibits a viscoelastic figure of merit (VFOM) of greater than or equal to about 0.001.

In one aspect, the applying of the first charged material forms a first layer and the applying of the second charged material forms a second layer that defines a first polymeric matrix layer of the biomimetic composite. The method further comprises forming a plurality of polymeric matrix layers of the biomimetic composite by repeated sequential applying of the first charged material and the second charged material.

In one aspect, the polymer is independently selected from the group consisting of: polyelectrolytes, phenolic resins, epoxy resins, acrylic resins, urethane resins, derivatives, copolymers, and combinations thereof.

In one aspect, the polymeric matrix comprises one or more polyelectrolytes selected from the group consisting of: poly(allylamine), poly(acrylic acid), poly(diallyldimethylammonium chloride), polyethyleneimine, and polystyrene sulfonate.

In one aspect, the plurality of nanostructures is a plurality of substantially aligned axial geometry nanowires comprising zinc oxide.

In one further aspect, the method further comprises forming the plurality of substantially aligned axial geometry nanowires comprising zinc oxide on the substrate by hydrothermal growth.

In one aspect, the plurality of nanostructures is a plurality of hedgehog-shaped nanoparticles comprising zinc oxide.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figures 5A, 5B, 5C, 5D, 5E, 5F, 5G, 5H:
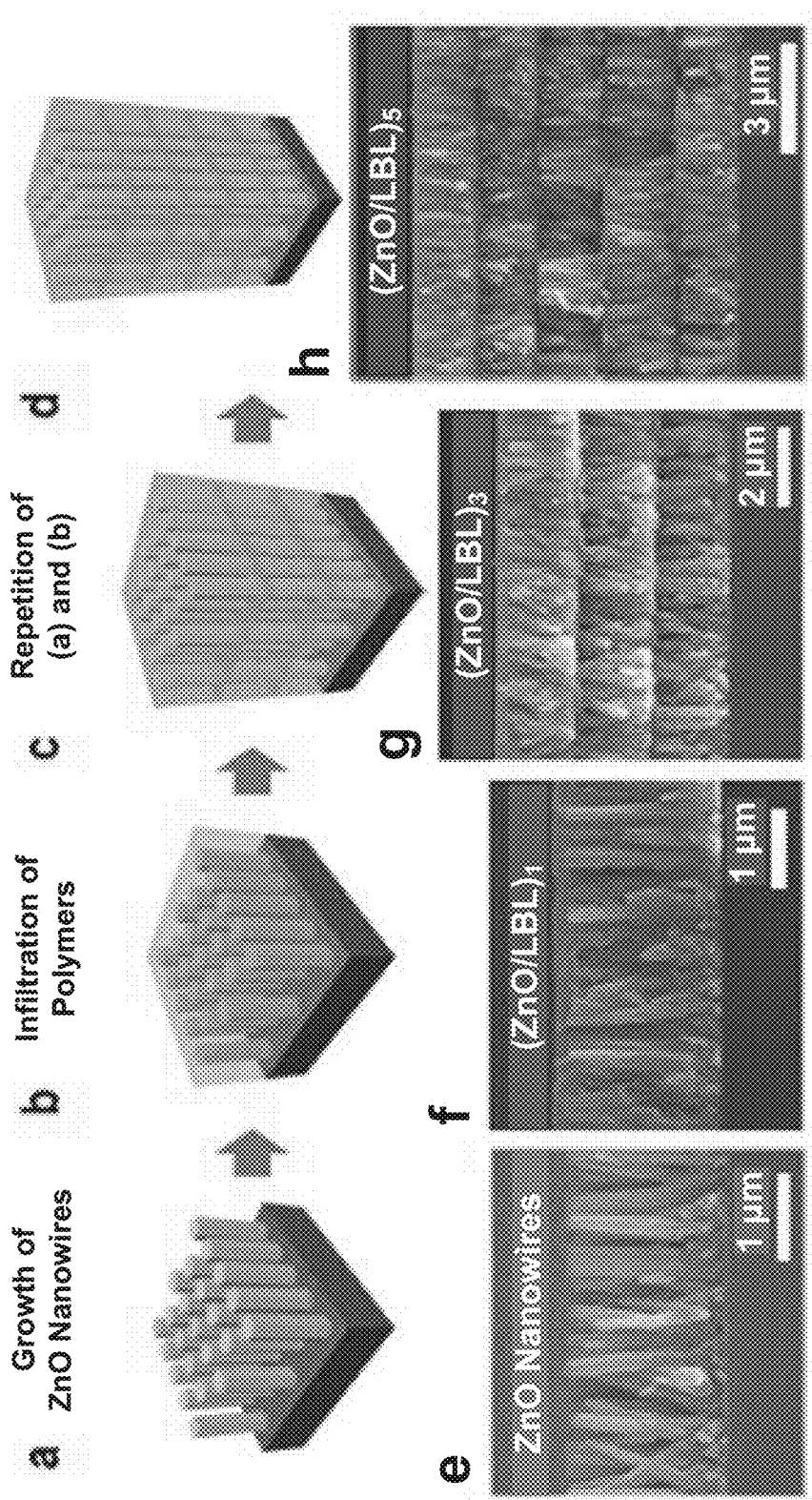

FIGS. 5A-5H show a schematic illustration of the preparation and structure of columnar biomimetic composites produced by sequential LBL infiltration of zinc oxide (ZnO) nanowires (NWs) with polymers according to certain aspects of the present disclosure. In FIG. 5A, ZnO NWs are grown on a silicon substrate. In FIG. 5B, the ZnO NWs are coated with LBL thin films, uniformly coating the NWs and filling the voids between the nanowires. These steps are repeated until a desired number of columnar layers, n, are deposited (FIGS. 5C and 5D). FIGS. 5E-5H show cross-sectional SEM images corresponding to each step of the process shown below each step (FIG. 5E corresponds to FIG. 5A, FIG. 5F corresponds to FIG. 5B, FIG. 5G corresponds to FIG. 5C, and FIG. 5H corresponds to FIG. 5D).

FIGS. 6A-6H show mechanical properties of artificial biomimetic columnar composites prepared in accordance with certain aspects of the present disclosure. Static nanoindentation tests of Young's modulus ($E_T$) (FIG. 6A) and hardness (FIG. 6B) as a function of contact depth are shown. NanoDMA nanoindentation tests of storage modulus (E') (FIG. 6C) and tan δ coefficient (FIG. 6D) as a function of contact depth at ω=220 Hz. E' and tan δ of $(ZnO/LBL)_3$ and $(ZnO/LBL)_5$ are shown in (FIGS. 6E-6H) at ω=1, 10, 100, and 200 Hz for the Berkovich probe, and ω=0.1, 14, 100, and 200 Hz for the conical probe as the contact depth increases. The error bar shows standard deviation (n=3-10).

Figure 7:
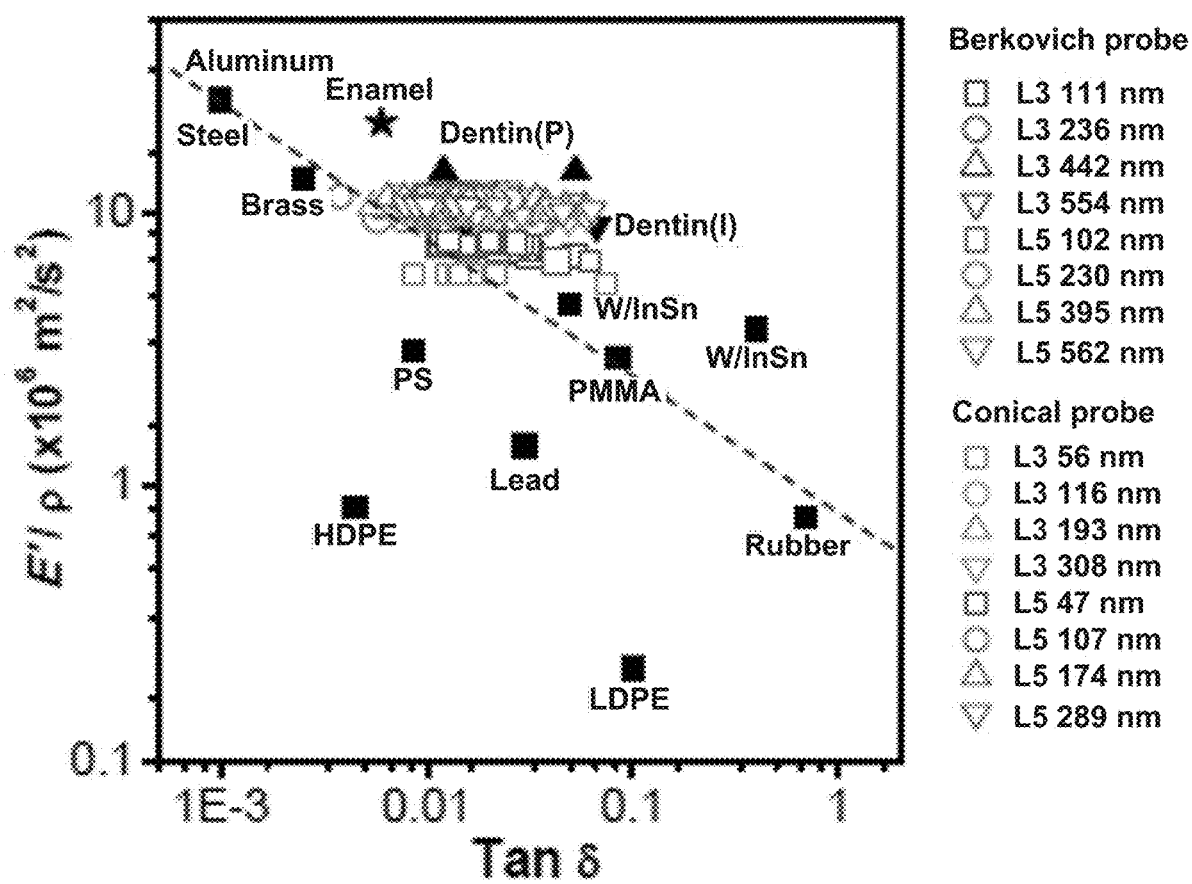

FIG. 7 is an illustration of energy dissipation (tan δ) and load bearing characteristics (E'/ρ) of $(ZnO/LBL)_n$ biomimetic composites prepared in accordance with certain aspects of the present disclosure as compared to man-made materials and naturally formed biocomposites. E'/ρ·tan δ values for columnar biocomposites exceed the density-adjusted property correlation limit for conventional materials, expressed as E'/ρ·tan $δ^{0.5}$=0.8 marked by the dotted line. Open symbols, values for (ZnO/LBL)n, are shown in key. Label in key shows sample name—(ZnO/LBL)n is referred to as Ln—and contact depth of Berkovich and conical indentation probes. Filled symbols are labelled with the material name. The weight-adjusted viscoelastic figure of merit (VFOM) for columnar biocomposites exceeds the limit for conventional materials, expressed as (E/ρ)×(tan δ)0.5=0.8 and marked by the dashed line. Dentine (I) and Dentine (P) are intertubular and peritubular dentine, respectively, and two points (minimum and maximum of tan δ) are selectively shown from Ryou, H., et al., "Nanoscopic dynamic mechanical properties of intertubular and peritubular dentin. J. Mech. Behay. Biomed. Mater. 7, 3-16 (2012), the relevant portions of which are incorporated herein by reference. Values for polystyrene, high-density polyethylene (HDPE), low-density polyethylene (LDPE), poly(methyl methacrylate) (PMMA), and W/InSn composites are reported according to the data from Wang, Y. C., et al., "Deformation of Extreme Viscoelastic Metals and Composites," Mater. Sci. Eng. A 370, 41-49 (2004), the relevant portions of which are incorporated herein by reference.

Figures 8A, 8B, 8C, 8D:
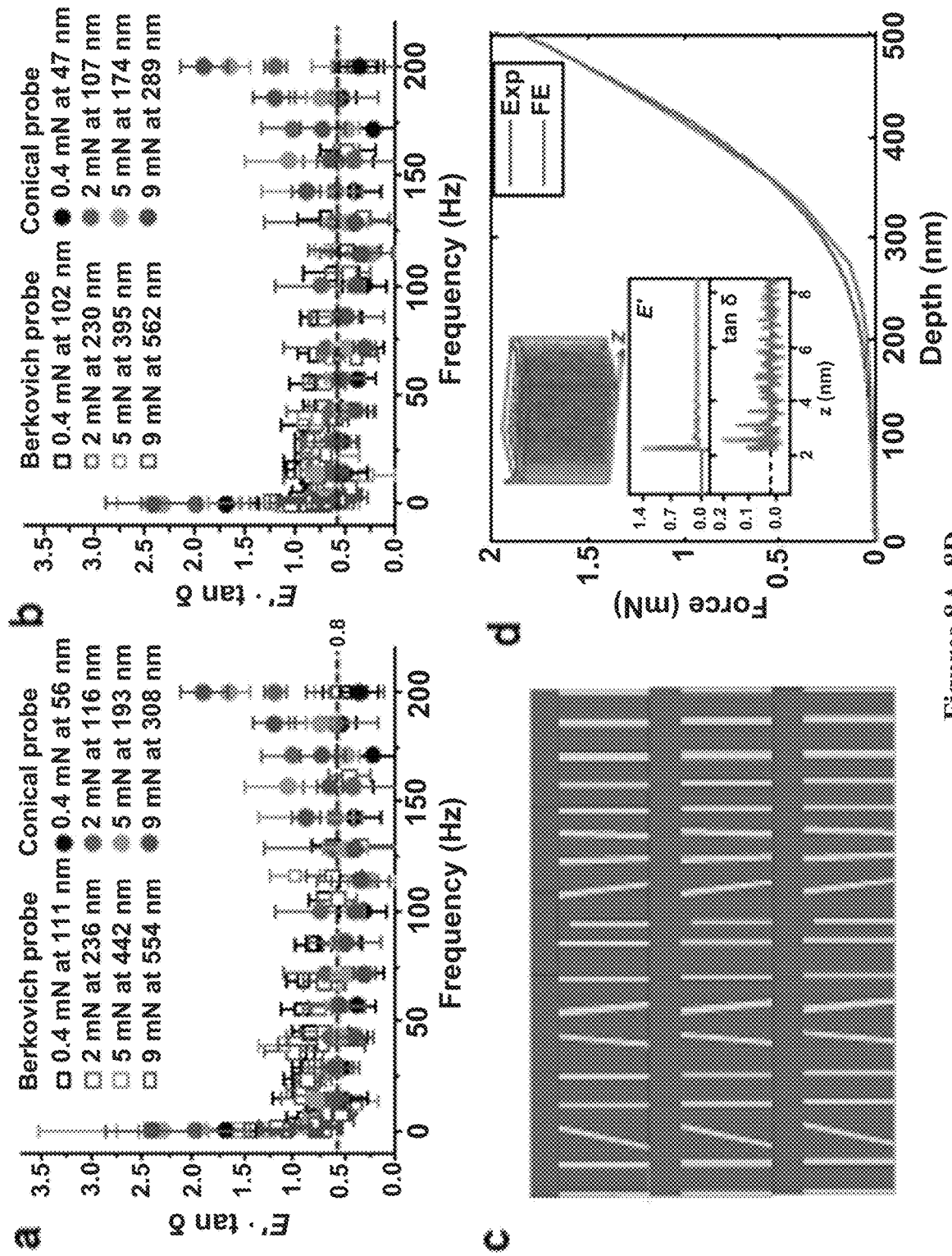

FIGS. 8A-8D illustrate dynamic mechanical properties of the artificial columnar biomimetic composites prepared in accordance with certain aspects of the present disclosure. NanoDMA evaluation of E'·tan δ for $(ZnO/LBL)_3$ (FIG. 8A) and $(ZnO/LBL)_5$ (FIG. 8B) are shown. FIG. 8C is a representation of the $(ZnO/LBL)_3$ sample in FE simulations of nanoindentation on columnar composites. FIG. 8D is a force versus a depth curve for static nanoindentation from FE simulation. In the inset: MD simulation cell and computed mechanical properties for the storage modulus, E', and tan δ at the ZnO-polymer matrix interface. MD simulations show simultaneous increase in stiffness and damping at the interface. The error bar shows standard deviation for number of indents n=3-10.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In certain aspects, the present disclosure provides methods for formation of biomimetic nanocomposites having a plurality of column or nanowire structures disposed within a matrix. Such ex vivo replication of enamel-inspired columnar nanocomposites thus forms biomimetic abiotic enamel-like structures (ELS) with columnar structures having an unusual combination of mechanical properties, including high stiffness and high damping coefficient that can be cumulatively expressed as the high values of viscoelastic figure of merit (VFOM). The mechanical properties, including hardness, of such a composite is comparable to those of naturally formed enamel, despite having a smaller hard phase content (e.g., 18 vol. %). The biomimetic composites contemplated herein are light-weight structural materials with unusually high resistance to structural damage from shocks, environmental vibrations, and oscillatory stress. Previously inaccessible combinations of high stiffness, damping, and light-weight found in these composites (for example, formed via a layer-by-layer process) are attributed to efficient energy dissipation in the interfacial portion of the organic phase, whose contribution to the macroscale deformations along a normal direction is maximized for columnar architecture. Thus, such columnar composites provide high performance load-bearing materials.

In various aspects, the present disclosure thus contemplates a biomimetic composite comprising a plurality of microstructures or nanostructures each having at least one axial geometry region comprising an inorganic material. A polymeric matrix is disposed in void regions defined between respective nanostructures of the plurality of nanostructures.

A "microstructure" as used herein encompasses "nanostructures," as discussed below. The term "micro-sized" or "micrometer-sized" as used herein is generally understood by those of skill in the art to mean less than about 500 µm (i.e., 0.5 mm). As used herein, a microstructure has at least one spatial dimension that is less than about 10 µm (i.e., 10,000 nm), optionally less than about 5 µm (i.e., 5,000 nm), optionally less than about 1 µm (i.e., 1,000 nm), optionally less than about 0.5 µm (i.e., 500 nm), and in certain aspects less than or equal to about 0.1 µm (i.e., 100 nm).

In certain aspects, the nanostructures or nanoparticles are "nano-sized" or "nanometer-sized" and have at least one spatial dimension that is less than about 10 µm (i.e., 10,000 nm), optionally less than about 1 µm (i.e., 1,000 nm), optionally less than about 0.5 µm (i.e., 500 nm), optionally less than about 0.4 µm (i.e., 400 nm), optionally less than about 0.3 µm (i.e., 300 nm), optionally less than about 0.2 µm (i.e., 200 nm), and in certain variations, optionally less than about 0.1 µm (i.e., 100 nm). Accordingly, a nanostructure has at least one spatial dimension that is greater than about 1 nm and less than about 10,000 nm (10 µm). In certain variations, at least one spatial dimension of the nanostructure is about 20 nm to about 2,000 nm. In still other variations, a nanostructure may have at least one spatial dimension of about 5 nm to about 500 nm. It should be noted that so long as at least one dimension of the nanostructure falls within the above-described nano-sized scale (for example, diameter), one or more other axes may well exceed the nano-size (for example, length and/or width).

In certain variations of the present teachings, the present disclosure contemplates a microstructure or nanostructure that is a component having an axial geometry with an evident major (e.g., longitudinal) axis for use in a composite. Axial geometry structures are anisotropic and have a cylindrical, columnar, pillar, rod, tube, or fibrous shape with an evident elongated longitudinal axis, which is longer than the other dimensions (e.g., diameter or width), thus having an axial anisotropic geometry. Generally, an aspect ratio (AR) for cylindrical shapes (e.g., a wire, pillar, a rod, tube, fiber, etc.) is defined as AR=L/D, where L is the length of the longest axis (here the major longitudinal axis) and D is the diameter of the nanostructure (e.g., wire). Suitable axial geometry micro- and nanostructures for use in the present technology generally have high aspect ratios, for example, ranging from at least about 100 to in excess of 1,000, for example. In yet other aspects, such axial geometry micro- and nanostructures may have an aspect ratio of 5,000 or more and in certain variations 10,000 or more. In certain variations, where the axial geometry nanostructure or nanocomponent is a nanowire, it may have a length of less than or equal to about 10 µm, for example, optionally from greater than or equal to about 100 nm to less than or equal to about 10 µm or greater than or equal to about 1 µm to less than or equal to about 10 µm. Reference herein to nanostructures should also be understood to encompass microstructures and submicron-scale structures. The axial geometry micro- and nanostructures, including microcolumns, nanocolumns, micropillars, and nanopillars are used interchangeably and will be generically referred to as "axial geometry nanostructures" or "nanowires" herein.

Figure 3:
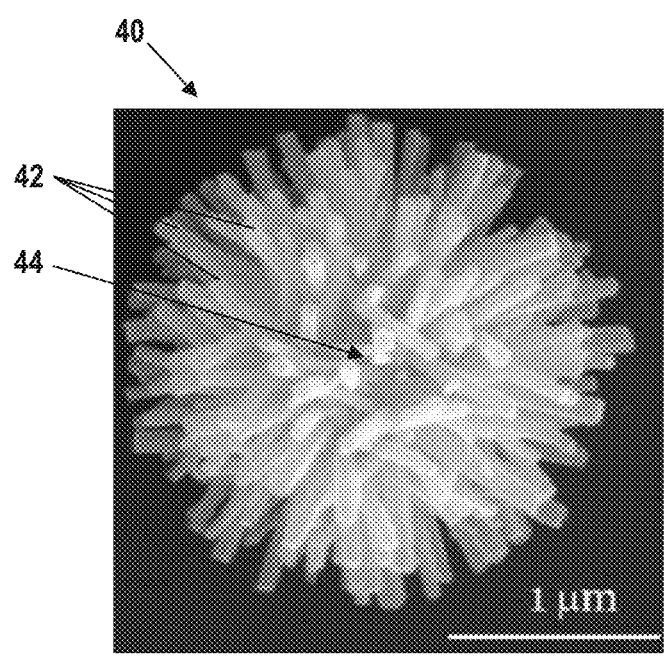
FIG. 3 shows a scanning electron microscopy image of a hedgehog-shaped microparticle.

In other variations, as will be described in further detail below, the microstructure or nanostructure may have at least one region or component with an axial geometry, such as a hedgehog-shaped particle (for example, as shown in FIG. 3) having at least one axial geometry region in the form of individual axial geometry structures (e.g., needles, wires, or spikes) protruding from a central core region, as will be described further below. These vibration isolation structures are formed by assembly of hedgehog-shaped microparticles, submicron scale particles, and nanoparticles into layers and three-dimensional solids.

In certain aspects, where the nanostructures are themselves axially-shaped, each nanostructure of the plurality of axially-shaped nanostructures has substantially the same orientation relative to a substrate on which they are disposed. For example, in certain aspects, each axially-shaped nanostructure of the plurality respectively defines a major longitudinal axis that intersects with a plane defined by a substrate and has substantially the same orientation relative to a major horizontal plane formed by the substrate. In certain preferred aspects, the axially-shaped particles of the plurality have substantially the same vertical orientation relative to a horizontal plane formed by the substrate. The plurality of such axially-shaped particles may define a carpet or forest. The vibration isolation materials may be formed by stratified growth of one forest layer on top of another forest layer, with impregnation of each layer with a polymer matrix. An overall number of forest strata can be as many as needed to reach a specific thickness for the composite material, for example a thickness ranging from greater than or equal to about 500 nm to less than or equal to about 500 cm in certain variations.

Figure 1:
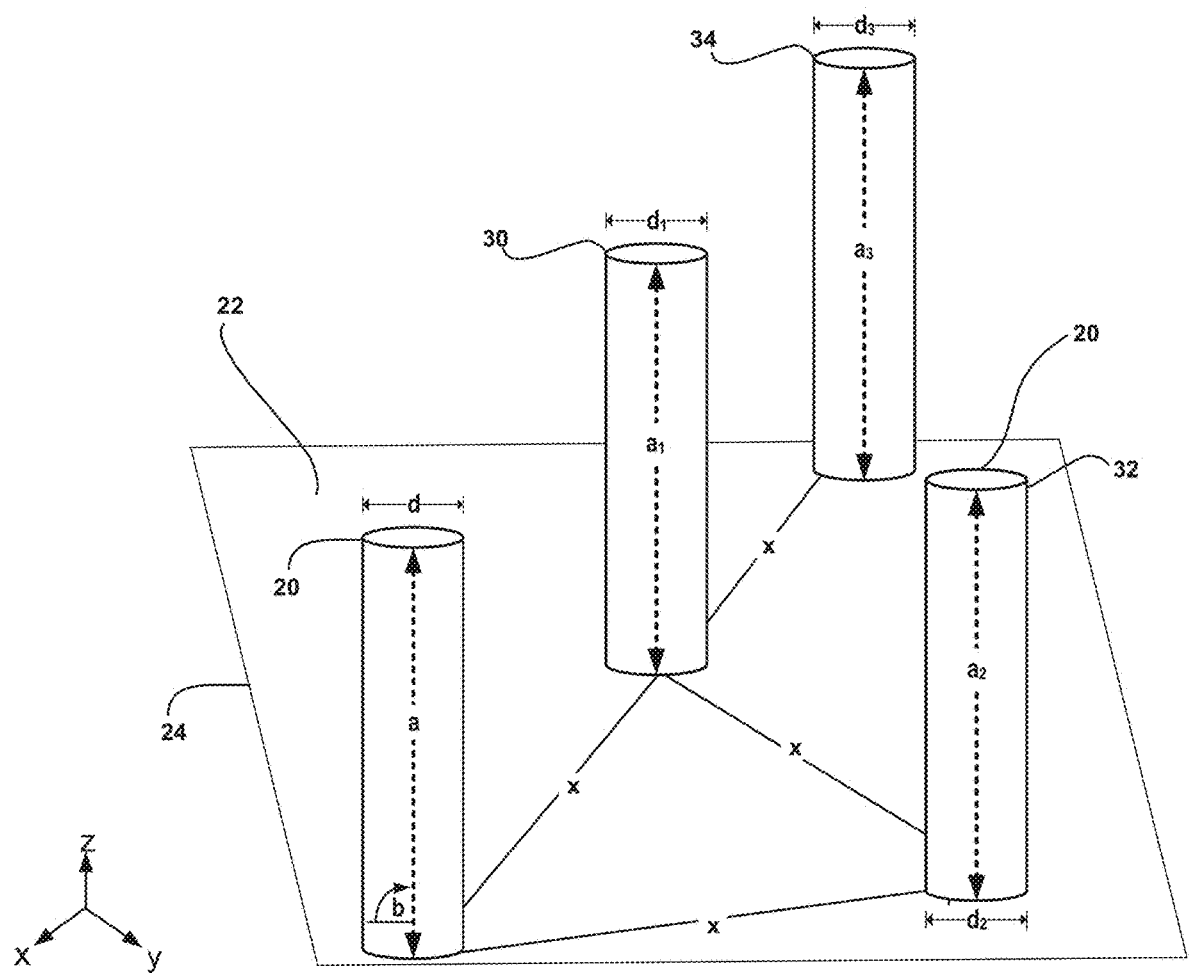
FIG. 1 depicts an exemplary schematic of a plurality of axially-shaped nanostructures (e.g., nanowires) used to form a biomimetic composite according to certain aspects of the present disclosure.

FIG. 1 depicts an exemplary schematic of a plurality of axially-shaped nanostructures 20 (e.g., nanowires) used to form a biomimetic composite according to certain aspects of the present teachings. The plurality of axially-shaped nanostructures 20 are formed or disposed on a surface 22 of a substrate 24. The nanostructures 20 may be disposed on the surface 22 in a regular predetermined pattern or may be distributed randomly (e.g., as they are grown). An average spacing between the nanostructures 20 is designated "x" and an average diameter of the nanostructures 20 is designated "d." Notably, some variation in "x" and "d" may occur.

Each axially-shaped nanostructure 20 of the plurality respectively defines a major longitudinal axis ("a") that intersects with a horizontal plane (corresponding to the x-y axes) defined by surface 22 at an angle designated "b." In certain aspects, the plurality of axially-shaped nanostructures 20 is substantially vertical with respect to the horizontal plane formed by the surface 22. However, in certain other aspects, differing angles b may be employed if the volume ratio is kept sufficiently low. In certain embodiments, the major longitudinal axis "a" defines an average angle "b" for the plurality of axially-shaped nanostructures 24 that ranges from greater than or equal to about 45° to less than or equal to about 90°, optionally greater than or equal to about 50° to less than or equal to about 90°, optionally greater than or equal to about 60° to less than or equal to about 90°, optionally greater than or equal to about 70° to less than or equal to about 90°, optionally greater than or equal to about 80° to less than or equal to about 90°, optionally greater than or equal to about 85° to less than or equal to about 90°, optionally greater than or equal to about 87° to less than or equal to about 90°, optionally greater than or equal to about 88° to less than or equal to about 90°, and in certain variations, optionally greater than or equal to about 89° to less than or equal to about 90°.

As shown in FIG. 1, a first axially-shaped nanostructure 30 has a first major longitudinal axis designated "$a_1$" and a first diameter "$d_1$." A second axially-shaped nanostructure 32 likewise has a second major longitudinal axis designated "$a_2$" and second diameter "$d_2$," while a third axially-shaped nanostructure 34 has a third major longitudinal axis designated "$a_3$" and a diameter of "$d_3$."

In certain variations, an average height along the major longitudinal axis ("a") of the nanostructures 20 is greater than or equal to about 100 nm to less than or equal to about 10 micrometers (μm), optionally greater than or equal to about 1 μm to less than or equal to about 10 μm. In certain aspects, the major longitudinal axis of the nanostructures 20 is greater than or equal to about 100 nm, optionally greater than or equal to about 200 nm, optionally greater than or equal to about 300 nm, optionally greater than or equal to about 400 nm, optionally greater than or equal to about 500 nm, optionally greater than or equal to about 600 nm, optionally greater than or equal to about 700 nm, optionally greater than or equal to about 800 nm, optionally greater than or equal to about 900 nm, and in certain variations, optionally greater than or equal to about 1,000 nm (1 μm).

In certain variations, an average diameter ("d") of the nanostructures 20 is greater than or equal to about 50 nm to less than or equal to about 1 μm. In certain variations, an average diameter of the nanostructures 20 is less than or equal 900 nm, optionally less than or equal to about 800 nm, optionally less than or equal to about 700 nm, optionally less than or equal to about 600 nm, and in certain variations, optionally less than or equal to about 500 nm. In certain variations, the nanostructures 20 have an average diameter of greater than or equal to about 50 nm to less than or equal to about 1 μm, optionally greater than or equal to about 500 nm to less than or equal to about 600 nm.

Figure 2:
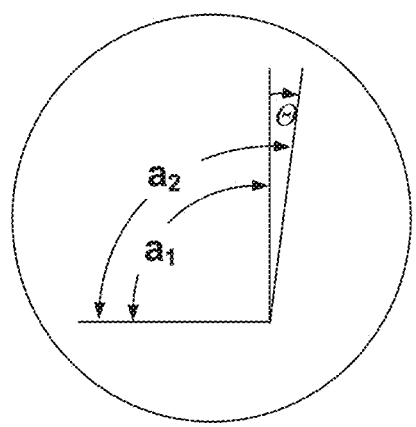
FIG. 2 shows angles formed between a first axially-shaped nanostructure and a second axially-shaped nanostructure as shown in FIG. 1.

The periodic arrays of nanostructures 20 in accordance with the present teachings can be controlled to have different properties by controlling not only the dimensions of the nanostructure 20, but also the relative spacing "x" between respective nanostructures 20 to provide different densities. There may be some amount of variation in the angles "b" of each longitudinal axis "a" due to variances in manufacturing. First and second major longitudinal axes $a_1$ and $a_2$ are considered to be "substantially aligned" with one another along a predetermined orientation when the angle formed between them (shown as offset angle Θ in FIG. 2, between exemplary axes $a_1$ and $a_2$) is less than or equal to about 15°, optionally less than or equal to about 10°, optionally less than or equal to about 9°; optionally less than or equal to about 8°; optionally less than or equal to about 7°; optionally less than or equal to about 6°. In certain embodiments, an offset angle Θ formed between first and second major longitudinal axes $a_1$ and $a_2$ is less than or equal to about 5°; optionally less than or equal to about 4°; optionally less than or equal to about 3°; optionally less than or equal to about 2°; and optionally less than or equal to about 1°. As will be appreciated by those of skill in the art, a plurality of axially-shaped nanostructures 20 can be considered to be "substantially aligned" in a predetermined single orientation when an average offset angle Θ is small and less than the amounts specified above, although individual nanostructures/nanowires may have major longitudinal axes that intersect with a horizontal plane of the substrate at a greater angle "b" and therefore have a greater angle of deviation from the longitudinal axes of the other nanostructures than those specified.

In other variations, the microstructures/nanostructures disposed on the surface of the substrate may be hedgehog particles 40 that generally emulate the shape of a hedgehog animal in that the particles have needles or spikes 42 protruding from a central core region 44, as shown in FIG. 3. Accordingly, hedgehog-shaped particles are multi-component particles with binary size regimes that may comprise a micron-scale polymeric core on which inorganic needles or nanowires are sculpted orthogonal to the core surface. As shown in FIG. 3, hedgehog-shaped particles 40 have the core region 44 formed of a first material and the plurality of spikes or needles 42 having an axial geometry, which are anisotropic with an evident elongated longitudinal axis that is longer than the other dimensions (e.g., diameter or width). The needles 42 are connected to a surface of the core region 44. In various aspects, the needles 42 are substantially orthogonal to a surface of the core region 44. By "substantially orthogonal," it is meant that a longitudinal axis of the needle 42 may form an angle with respect to the core surface (where the needle is connected) having an angle of about 90° or another angle that slightly deviates from 90°, for example, deviates up to about 15° (e.g., from about 75° to about 105°).

Figure 4:
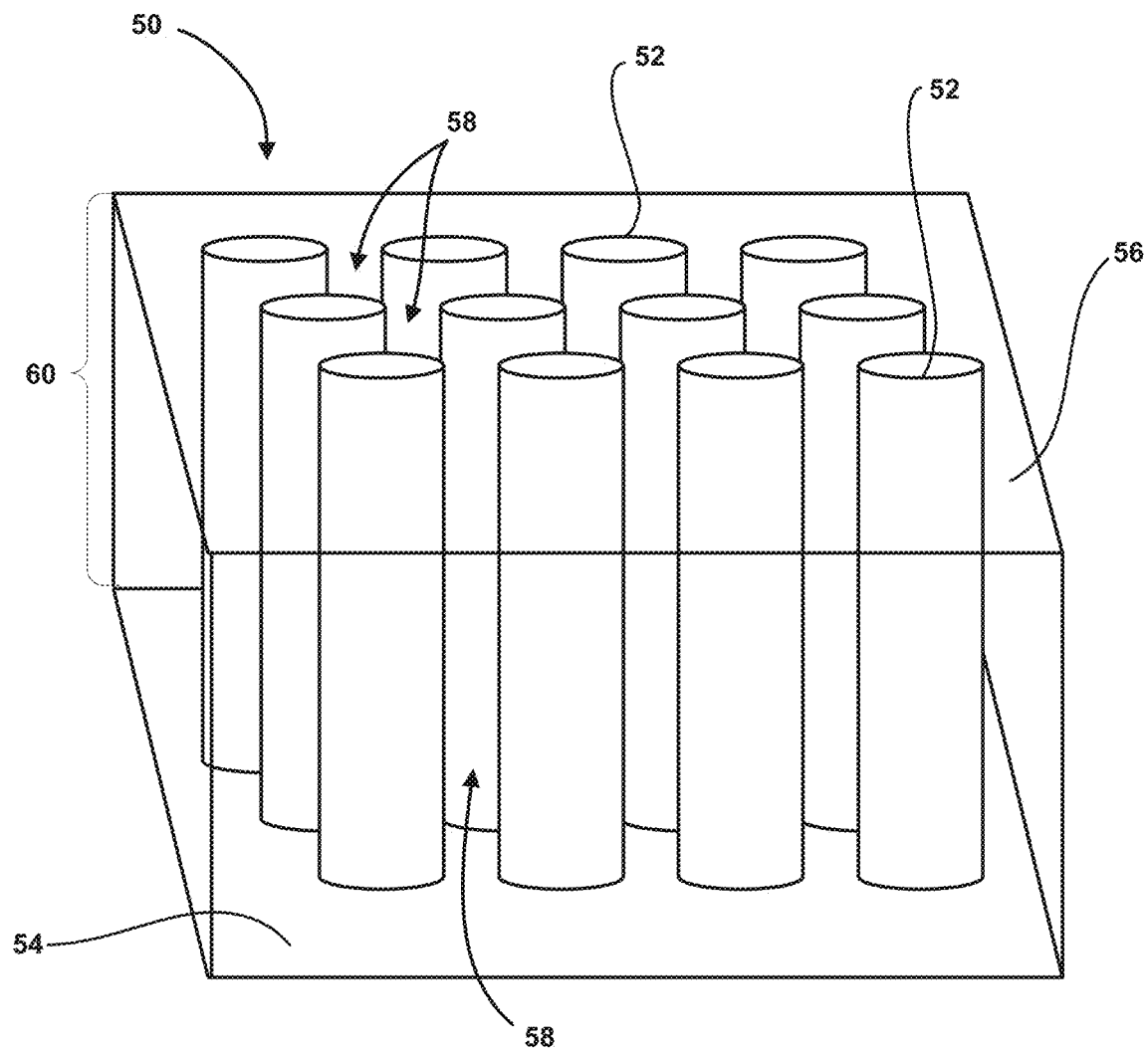
FIG. 4 shows an exemplary biomimetic nanocomposite formed according to certain aspects of the present disclosure.

FIG. 4 shows a nanocomposite 50 formed according to certain aspects of the present disclosure. The nanocomposite 50 includes a plurality of axial-geometry nanostructures 52 disposed on a substrate 54. Each axial-geometry nanostructure 52 is substantially aligned and has a vertical orientation with respect to a plane of the substrate 54. A polymeric matrix 56 is disposed in void regions 58 defined between respective nanostructures 52. In this manner, a composite layer 60 is formed that has a predefined height or thickness. As discussed further below, it should be noted that the process of forming the composite may be sequentially repeated to build a composite having multiple layers, so that the composite layer 60 is part of a multi-layered composite structure.

While not shown in FIG. 4, the axial-geometry nanowire/nanostructures may be substituted with a plurality of hedgehog-shaped microparticles distributed in the polymeric matrix to define the composite. The vibration isolation composite material may comprise hedgehog-shaped particles deposited in the layered fashion to obtain a three-dimensional solid. The pores of the three-dimensional solid are infused with the polymer(s). Thus, in certain variations, the hedgehog-shaped particles may form three-dimensional solid structure or a coating with a polymer. In certain variations, a thickness of the hedgehog-based solid composite can be from greater than or equal to about 300 nm to less than or equal to about 500 cm and can vary depending on the application.

In certain aspects, the present disclosure contemplates forming composites that replicate enamel both structurally and functionally, which can be made by processes that involve sequential growth of nanowires (NW), such as zinc oxide nanowire carpets followed by layer-by-layer deposition (LBL) of a polymeric matrix around them. Such biomimetic abiotic enamel-like composite structures having a columnar structural motif reveal unusual combinations of mechanical properties, such as high stiffness and high damping coefficient, which can be cumulatively expressed as high values of viscoelastic figure of merit (VFOM). Such materials can be used for stiff load bearing components that can concurrently insulate vibration sensitive components from external damage, shock, and vibrational fatigues.

Therefore, biomimetic composites prepared in accordance with certain aspects of the present disclosure may have mechanical properties, including hardness, comparable to those of enamel despite 18 vol. % smaller hard phase content. Importantly, their viscoelastic figure of merit (VFOM) and weight-adjusted VFOM, describing resistance to vibrational damage, are similar or higher than those of enamels exceeding 0.6 or 0.8, respectively, representing the limits of traditional materials. The viscoelastic properties of materials may be characterized by viscoelastic figure of merit (VFOM), i.e. the product of storage or Young's modulus (in GPa) and damping coefficient (unitless). For example, a vibration isolation biomimetic composite prepared in accordance with certain aspects of the present disclosure may have a viscoelastic figure of merit (VFOM) of greater than or equal to about 0.001, optionally greater than or equal to about 0.005, optionally greater than or equal to about 0.01, optionally greater than or equal to about 0.05, optionally greater than or equal to about 0.1, optionally greater than or equal to about 0.2, optionally greater than or equal to about 0.3, optionally greater than or equal to about 0.4, optionally greater than or equal to about 0.5, and in certain variations, optionally greater than or equal to about 0.6. In certain aspects, the VFOM of the vibration isolation biomimetic composite may be greater than or equal to about 0.001 to less than or equal to about 0.6. Further, the biomimetic composite prepared in accordance with certain aspects of the present disclosure may have a weight-adjusted viscoelastic figure of merit (VFOM) of greater than or equal to about 0.8. The biomimetic composites made in accordance with the present disclosure provide light-weight structural materials with unusually high resistance to structural damage from shocks, environmental vibrations, and oscillatory stress can be practically made using biomimetic design. Previously inaccessible combinations of high stiffness, damping, and light-weight found in the composite prepared in accordance with certain aspects of the present disclosure (e.g., LBL composites) are attributed to efficient energy dissipation in the interfacial portion of the organic phase, whose contribution to the macroscale deformations along a normal direction is maximized for columnar architecture. This specific design of columnar composites thus provides high performance load-bearing materials.

In certain aspects, the composites prepared in accordance with the present disclosure have a Young's modulus (E or $E_y$) that may be greater than or equal to about 30 GPa, optionally greater than or equal to about 35 GPa, optionally greater than or equal to about 40 GPa, optionally greater than or equal to about 50 GPa, optionally greater than or equal to about 60 GPa, optionally greater than or equal to about 70 GPa, and in certain aspects, optionally greater than or equal to about 75 GPa. In certain aspects, the Young's modulus may be greater than or equal to about 30 GPa to less than or equal to about 80 GPa, optionally greater than or equal to about 35 GPa to less than or equal to about 45 GPa. The range of moduli can be varied by modifying the volumetric amounts of the inorganic materials (e.g., nanostructures) with respect to the organic matrix materials.

In certain other aspects, the composites prepared in accordance with the present disclosure have a storage modulus (E') that may be greater than or equal to about 25 GPa, optionally greater than or equal to about 30 GPa, optionally greater than or equal to about 35 GPa, optionally greater than or equal to about 40 GPa, optionally greater than or equal to about 50 GPa, optionally greater than or equal to about 60 GPa, optionally greater than or equal to about 70 GPa, and in certain aspects, optionally greater than or equal to about 75 GPa. In certain aspects, the storage modulus may be greater than or equal to about 25 GPa to less than or equal to about 80 GPa, optionally greater than or equal to about 25 GPa to less than or equal to about 50 GPa. Again, adjustment of the volumetric amounts of the inorganic material to organic material in the composite can result in varying the moduli.

A hardness of the composite material prepared in accordance with certain aspects of the present disclosure may be greater than or equal to about 1 GPa. In certain aspects, the hardness of the composite material may be greater than or equal to about 1 GPa to less than or equal to about 2 GPa.

In certain variations, an overall thickness of the composite may be greater than or equal to about 1 micrometer (μm) to less than or equal to about 1 meter (m). When the thickness of the composite is greater than or equal to about 1 mm, the composite can be used for vibration-isolation of large structures of sensitive instrumentations, safety armors/shields, vehicular, automotive, and aerospace applications, safety buildings, construction, and other installations. When the thickness is less than or equal to about 1 mm, the composite material may be a coating that can be used for devices in applications such as electronics, photonics, optoelectronics, magnetooptics and energy storage devices. In certain variations, a thickness of a vibration isolation composite may be greater than or equal to about 500 nm to less than or equal to about 500 cm.

The lightweight biomimetic composite materials made in accordance with certain aspects of the present disclosure (e.g., formed of abundant inexpensive high VFOM components) can be used in many different technology areas, exemplified by the automotive, electronics, aerospace, and other industries where long-term low-impact wear-resistance is required. By way of non-limiting example, biomimetic composites prepared in accordance with certain aspects of the present disclosure having a columnar structural motif may be used in biomedical implants. In other aspects, biomimetic composites prepared in accordance with certain aspects of the present disclosure can be used as solid vibration isolation support elements for various types of devices, including electronic devices, such as processors, motherboards, memory chips, and the like. Similarly, biomimetic composites prepared in accordance with certain aspects of the present disclosure may be used in photonic devices, such as solid state-lasers, optical elements, beam steering devices, beam splitters, diffraction gratings, interferometers, photodetectors, and the like. The biomimetic composites may also be used as components within vibration resistant energy storage devices, such as secondary and structural batteries, supercapacitors, condensators, and the like or in memory devices, such as memristors, magnetooptical memory cells, hard drives, and the like. Furthermore, biomimetic composites prepared in accordance with certain aspects of the present disclosure can also be incorporated into electronic sensors and transducers, such as current and voltage sensor, electroscope, electron multiplier, MEMS based sensors, piezoelectric sensors, and the like.

Thus, in certain embodiments, a device incorporating the biomimetic composite as a component may be selected from the group consisting of: a biomedical implant, a vehicle, an aircraft, an automobile, safety armor, a shield, a building component, an electronic device, a photonic device, an optic device, an optoelectronic device, a magnetooptic device, an energy storage device, an electronic sensor, a transducer, and combinations thereof.

In yet other embodiments, a device incorporating the biomimetic composite as a component may be selected from the group consisting of: a processor, a motherboard, a memory chip, a solid state-laser, on optical element, a beam steering device, a beam splitter, a diffraction grating, an interferometer, a photodetector, a secondary battery, a structural battery, a supercapacitor, a condensator, a memristor, a magnetooptical memory cell, a hard drive, a current sensor, a voltage sensor, an electroscope, an electron multiplier, a microelectromechanical (MEMS) based sensor, and a piezoelectric sensor.

The plurality of nanostructures in the composite may be formed of an inorganic material, such as zinc oxide (ZnO). In other alternative variations, the nanostructures may comprise a material selected from the group consisting of silica, zirconia, carbon, iron oxide, other crystalline oxides, nitrides, carbides, and the like. In certain variations, where the nanostructures themselves have an axial geometry, they may be entirely formed from an inorganic material like zinc oxide. As discussed in more detail below, the axial-shaped zinc oxide nanostructures may be formed by hydrothermal growth and may be conducted sequentially. At the outset, a layer of ZnO nanoparticle (NP) seeds can be deposited from which the ZnO nanowires can be grown in an axial direction. In variations where the microstructure/nanostructures are hedgehog-shaped particles, the axial geometry needles or spikes may comprise an inorganic material, like zinc oxide. In certain aspects, the composite may comprise greater than or equal to about 15% to greater than or equal to about 95% by volume of the nanostructures. In certain variations, the composite has greater than or equal to about 15% to less than or equal to about 20% by volume of the nanostructures or hard phase, for example, about 18 volume % in one variation.

The polymeric matrix in the composite may be formed from a polymer, such as a polyelectrolyte. A polyelectrolyte is a polymeric macromolecule where a substantial portion of the constitutional units (e.g., monomers) contain ionizable and/or ionic pendant groups. In this manner, the polyelectrolyte has a repeating charged pendant group, meaning that one or more charged pendant groups are repeated or distributed along the backbone of the polymer. The polymeric matrix can include multiple polyelectrolyte layers that may be deposited via a layer-by-layer process described below. In certain variations, suitable polyelectrolytes include poly (allylamine), poly(acrylic acid), poly(diallyldimethylammonium chloride), polyethyleneimine, polystyrene sulfonate, and other polyelectrolytes with of amine-derivative moieties or acid groups, by way of example. In certain aspects, the polyelectrolyte may be selected from the group consisting of: poly(allylamine), poly(acrylic acid), poly(diallyldimethylammonium chloride), polyethyleneimine, polystyrene sulfonate, and combinations thereof. In certain variations, the polymeric matrix comprises at least two polyelectrolytes. The two or more polyelectrolytes may be selected from the group consisting of: poly(allylamine), poly(acrylic acid), poly(diallyldimethylammonium chloride), polyethyleneimine, polystyrene sulfonate, and combinations thereof. Additionally, other polymeric matrix materials are contemplated, such as phenolic, epoxy, acrylic, and urethane resins, derivatives, copolymers, and combinations thereof. In certain aspects, the composite may comprise greater than or equal to about 5% to greater than or equal to about 85% by volume of the matrix material or soft phase. In certain variations, the composite has greater than or equal to about 80% to less than or equal to about 85% by volume of the matrix or soft phase, for example, about 82 volume % in one variation.

The substrate may be formed of various known materials, including silicon, glass, concrete, asphalt, plastics/polymers and other supports, by way of non-limiting example. The biomimetic composite coating may be removed or separated from the substrate after formation.

The biomimetic composites can be prepared by the sequential growth of the zinc oxide inorganic nanowires with intermittent deposition of the polymer phase. In certain variations, composites replicating enamel (both structurally and functionally) can be made by sequential growth of zinc oxide nanowire (NW) carpets followed by layer-by-layer deposition (LBL) of a polymeric matrix around them.

Layer-by-layer assembly (LBL) provides a reliable method for fabricating polymer composites with favorable physical characteristics for the inventive technology. The LBL technique is well known and relies on alternating adsorption of charged species or polyelectrolytes onto a substrate. Layers are built up by sequential application of a material onto a substrate (e.g., spraying with or dipping into oppositely charged solutions having oppositely charged moieties that are attracted to the surface). Monolayers of individual components attracted to each other by electrostatic and van-der-Waals interactions are thus sequentially adsorbed on the substrate. LBL films can be constructed on a variety of solid substrates, thus imparting flexibility for size, geometry and shape and further patterned or etched (with chemicals, plasma, electron beam, or high intensity lasers, for example). Further, the LBL composite films may be detached from the substrate to form an independent material. Additionally, LBL multilayers have both ionic and electronic conductivity that provides favorable charge transfer characteristics.

In an exemplary LBL method, a substrate may have a first charge or a plurality of nanostructures deposited onto the substrate may have a first charge or polarity (referred to herein as a "first charged moiety"). A second charged material or moiety has a second polarity that is opposite to the charge of the first charged moiety. By way of non-limiting example, the first charged material may have positive charge, while the second charged moiety has a negative charge. The second charged material is thus applied to the first charged material in a first step (Step 1), for example, by applying the second charged material onto the regions of the substrate or around surfaces of the nanostructures. The driving force is electrostatic attraction. Additional steps may occur between application steps, such as washing of the surface before application of the next material. After application of the second charged material to the substrate and around the nanostructures, the surface of the substrate having the nanostructures can be exposed to a first wash material in Step 2, which is an optional step. Then, a third charged material or moiety having a third polarity opposite from the second polarity (and the same as the first polarity) is applied over the second charged material in Step 3. Then, the surface having the first charged material, the second charged material, and the third charged material can be exposed to a second wash material in Step 4, which like Step 2 is likewise optional.

Steps 1-4 serve as a single deposition cycle that may be repeated sequentially to build distinct alternating layers of the first charged material, second charged material, and/or third charged material. A composite material layer comprises at least the second charged material and the third charged material. Likewise, the third charged material may be a polycation or polyanion. Depending on the charge of the substrate, the first charged material may be either a polycation or a polyanion. The second charged material is the other of the polycation or the polyanion, having an opposite charge to the first charged material. Accordingly, a composite coating or material is formed by LBL is often referred to as: (polyanion/polycation)$_n$, where n represents the number of deposition cycles or layers present. LBL thus provides a simple tool for making coating structures having homogeneously dispersed, well organized layered structures with high levels of both polyanion and polycation.

In certain aspects of the present disclosure, a first charged material or moiety is the ZnO nanowires, which have a positive charge and may be a polycation. Of course, as appreciated by those of skill in the art, whether the first charged material is anionic or cationic depends on the material used to form the coating and the substrate charge. The second charged material may be a first polyelectrolyte with a negative charge or a polyanion. The third charged material may be a second polyelectrolyte that has a positive charge and may be a polycation.

In certain aspects of the present disclosure, a process of forming a composite material by a layer-by-layer technique may comprise: 1) providing a substrate; 2) optionally modifying the substrate to impart a charge; 3) growing a plurality of axially shaped nanostructures on the substrate; 4) contacting the substrate having the plurality of axially shaped nanostructures with a polyelectrolyte (e.g., by spraying, spinning, dipping, or coating); 5) rinsing the substrate, nanostructures, and polyelectrolyte with cleansing solution; and 6) repeating the steps of 3) to 6) to yield a coated composite substrate.

In other variations, the process of forming a composite material by a layer-by-layer technique may comprise: 1) providing a substrate; 2) optionally modifying the substrate to impart a charge; 3) growing a plurality of axially shaped nanostructures on the substrate; 4) contacting the substrate having the plurality of axially shaped nanostructures with a first polyelectrolyte (e.g., by spraying, spinning, dipping, or coating); 5) rinsing the substrate, nanostructures, and first polyelectrolyte with cleansing solution; 6) contacting the substrate having the first polyelectrolyte and plurality of axially shaped nanostructures with a second polyelectrolyte (e.g., by spraying, spinning, dipping, or coating); 7) rinsing the substrate, nanostructures, and first and second polyelectrolytes with cleansing solution; and 8) repeating the steps of 3) to 7) to yield a multilayered coated composite substrate.

In other aspects, where the microstructures/nanostructures are hedgehog shaped particles, the biomimetic composites of the present disclosure may be formed by depositing a plurality of hedgehog-shaped particles dispersed in a polymer that is a liquid, semi-liquid, or gel on a substrate. The mixture of the suspension of hedgehog-shaped particles and polymer is applied to the surface of the substrate by conventional application means (e.g., doctor blade, casting, lamination, extrusion, pad printing, spraying, silk screening, or the like). After deposition of the suspension of hedgehog shaped particles in polymer, the layer is dried to form the nanocomposite. This process may be repeated to build a multilayered composite.

Example

Fabrication of ZnO NW/LBL Columnar Composites.

The ex-vivo columnar biomimetic composites are constructed starting with hydrothermal growth of ZnO NWs shown in FIGS. 5A and 5E, followed by conformal filling of the inorganic template with a polyelectrolyte matrix with sequential LBL deposition of polyallylamine (PAAm) and polyacrylic acid (PAA) (FIGS. 5B and 5F) to form a single layer of composite. A polymeric matrix is infiltrated into gaps between individual ZnO NWs using an LBL method. Polyallylamine (PAAm, Mw=15 k, Polysciences, Inc.) and polyacrylic acid (PAA, Mw=50 k, Polyscience, Inc.) are diluted in ethanol to be 0.1% by volume. To assist effective infiltration of the polymer matrix, the spin-assisted LBL method is used to coat polymeric layers onto the surface of ZnO NWs with a spin rate of 3000 rpm for 20 sec. After spin coating the PAAm solution onto the ZnO NW substrate, the substrate is washed with ethanol and dried with a gentle stream of air. The PAA solution is then spin-coated over the PAAm-coated ZnO NW substrate, resulting in a (PAAm/PAA)$_{m=1}$ layer on the ZnO NWs, where m is the number of repeated depositions of two distinct polyelectrolytes. After deposition of m=40, the ZnO NW layer infiltrated with an LBL film of (PAAm/PAA)$_{40}$ is baked for 3 hours at 215° C. for cross-linking. The resulting film is denoted (ZnO/LBL)$_{n=1}$, where n is the number of repeated cycles of ZnO NW growth and LBL deposition. Growth of ZnO NWs and deposition of LBL films are repeated until the desired number (n) of layers is obtained.

Due to the fact that polyelectrolytes produce a hydrophilic layer over/on top of the ZnO carpet, planarizing the surface, a new layer of ZnO nanoparticle (NP) seeds can be deposited and the growth stage of ZnO NWs can be repeated with the same fidelity. The nanowire (NW)+LBL deposition process can be repeated for the desired number of cycles, as shown in FIGS. 5C and 5D. The corresponding columnar composite films are denoted (ZnO/LBL)$_n$ (FIGS. 5F-5H), where n is the number of cycles combining NW growth and deposition of 40 PAAm/PAA LBL bilayers. The resulting composites resemble the tooth enamel of rats, walruses, *Albertosaurus, Byrocturus*, and *Troodon* species. As noted above, tooth enamel is comprised of parallel micro- and nanoscale ceramic columns/prisms interlaced with a soft protein matrix.

Besides the visual similarity of the nano- and microscale architecture, (ZnO/LBL), composites provided by certain aspects of the present disclosure are formed with differing structural and biosynthetic parallels from enamel, which helps inform the mechanics of such composites, as described herein. Composite synthesis starts with NW growth, essentially reversing the sequence of enamel biosynthesis in nature. During amelogenesis, an organic matrix is secreted first and the resulting gel templates biomineralization of the inorganic phase. It is perhaps counterintuitive, but the reversal of the synthetic order in (ZnO/LBL)n composites enables accurate reproduction of the principal structural features of naturally formed enamels. The biomimetic composites are thus similar to/match the architecture of enamel and other columnar biocomposites qualitatively and quantitatively.

Figures 6E, 6F, 6G, 6H:
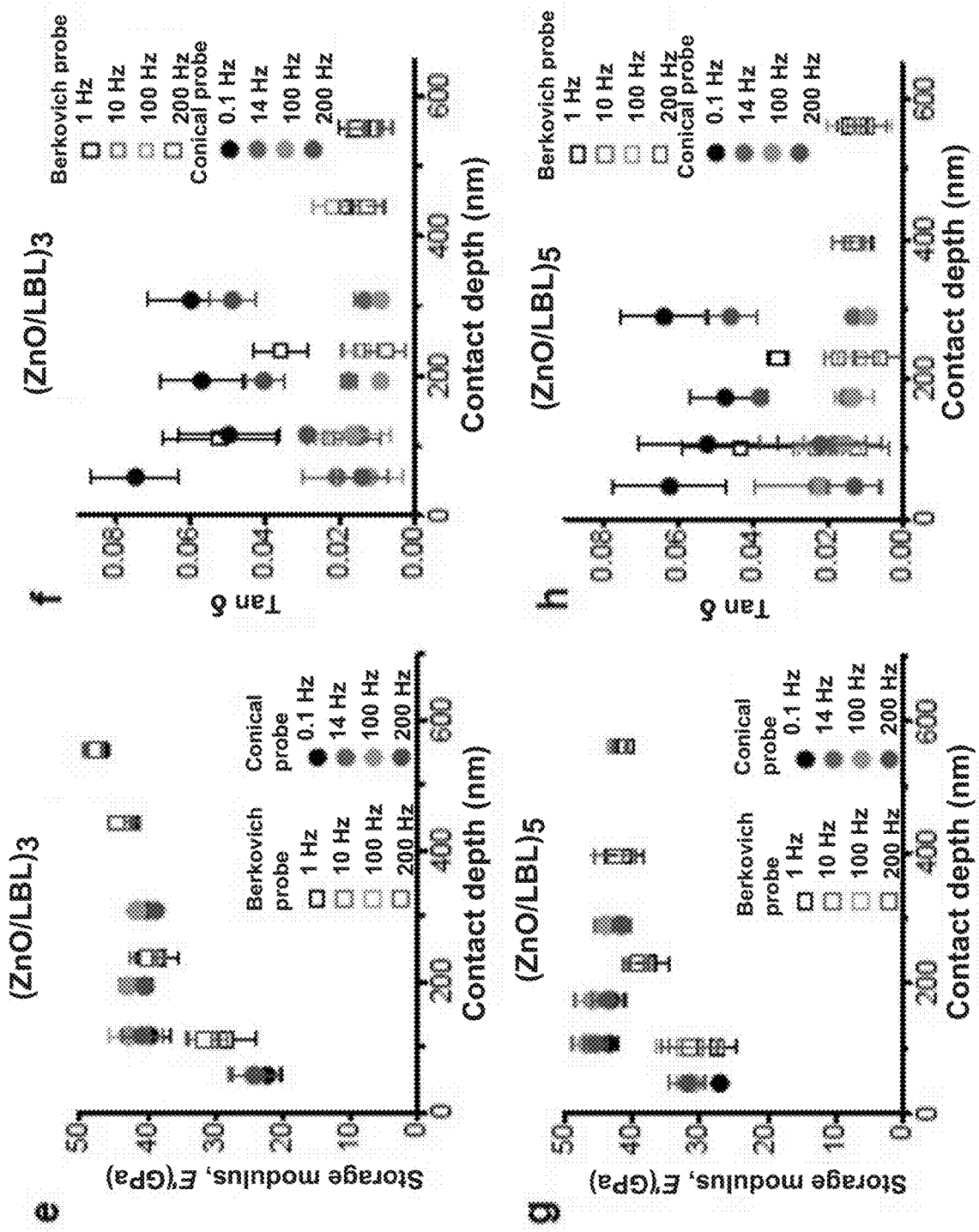

As generally shown in FIGS. 6A-6H, Young's modulus and hardness are shown. The modulus and hardness obtained at a depth of 400 nm for (ZnO/LBL)$_5$, with a 67 vol. % inorganic content are 44±4 GPa and 1.7±0.2 GPa, respectively. These data can be compared to moduli of 62-108 GPa and hardness of 1.1-4.9 GPa for tooth enamel with 85 vol. % inorganic content. The storage moduli (E') are independent of the frequency (co) of the indentation force (FIGS. 6C, 6E, 6G) and equal to 44.1±0.7 and 42.4±0.8 GPa for (ZnO/LBL)$_3$ and (ZnO/LBL)$_5$, respectively. Damping coefficient (tan δ) was the highest at low frequencies and, in case of macroscopic conical probe that models the compression stress on tooth enamel, for the high frequency of 200 Hz (FIGS. 6D, 6F, 6H). Importantly, no significant differences are observed for tan δ (co) in (ZnO/LBL)$_3$ and (ZnO/LBL)$_5$ indicating that high damping is characteristic for columnar materials architecture.

The viscoelastic properties of (ZnO/LBL)$_n$ reflect the durability of structural materials and their resilience to intermittent shock waves, oscillatory operational stress, and omnipresent environmental vibrations. Besides normal short-term high-impact damage, viscoelastic properties reduce the long-term low-impact damage or aging. The viscoelastic properties of materials are characterized by viscoelastic figure of merit (VFOM), i.e. the product of storage or Young's modulus (in GPa) and damping coefficient (unitless). Hard and stiff materials, e.g. metals and ceramics, that are of interest here, have a storage modulus of E'=50-150 GPa, but very low tan δ with values of ca. $10^{-3}$ to $10^{-4}$ making VFOM=E'·tan δ often below 0.01. Addition of soft metals in alloys increases the VFOM, but with the expense of high weight. Furthermore, it is known that VFOM for metals and other traditional materials cannot exceed 0.6, whereas materials with high VFOM are needed to increase the resilience to aging and shocks of load-bearing structures at all scales from electronic chips to residential buildings.

With tan δ values of 0.006-0.067, VFOM of enamels are unusually high, for example, exceeding other solid materials having similar storage moduli by 10-100 times (FIG. 7). From the biological perspective, this is not surprising, perhaps, because aging is of special importance for enamel as a non-living biomaterial that often cannot be renewed and has to last over the entire life-time of the living creatures. The values of E'·tan δ for (ZnO/LBL)$_n$ match those found in naturally formed enamels. They are also significantly above the presumed E'·tan δ=0.6 limit line for a variety of frequencies and is consistent for different (ZnO/LBL)$_n$ composites ranging between 0.7 and 0.9 for both types of tips used (FIGS. 8A-8B). It is also important to considered weight-adjusted VFOM for structural materials with presumed limit of 0.8 (FIG. 7). Considering the materials density (p), (ZnO/LBL), composites also provide better weight performance than many other biological or man-made viscoelastic materials (FIG. 7).

The damping coefficients in (ZnO/LBL), in FIGS. 8A-8D exceed the projections based on existing materials engineering models including the biomimetic composites. The tan δ value of (ZnO/LBL)$_3$ calculated using the Voigt model is 0.0018, which is nearly one order of magnitude lower than that observed experimentally. Such a large discrepancy is indicative of a different energy dissipation mechanism present in (ZnO/LBL)$_n$. Finite element (FE) and molecular dynamics (MD) simulations allow a better understanding of the unusual mechanical behavior of these columnar composites, which can be attributed to energy dissipation at the interface between stiff inorganic NWs and the soft organic matrix. A similar finding with respect to stiffness is modeled in, by appealing to the existence of an interphase. MD simulations reveal an increase in storage modulus at the interface between the surface and polymer as the interaction between the surface and polymer increases. FE simulations are based on interfacial layer thickness validated by MD simulations and replicated the indentation experiments over a range of frequencies. The in-silico static nanoindentation curves nearly match the experimental ones (FIG. 8D). FE simulations of dynamic indentation yield storage modulus values (Table 1) that also agree well with experimental results (FIGS. 6A-6H). The conclusion about role of the friction at the soft-hard interfaces is further strengthened by the comparative evaluation of viscoelasticity of ZnO/LBL columnar composites with shorter ZnO NWs.

TABLE 1

Simulated storage moduli (E') and tan δ for (ZnO/LBL)$_3$ under dynamic indentation conditions and experimental results with Berkovich tip.

| Frequency (Hz) | Depth (nm) | Storage Modulus (E') (GPa) | Tan δ | Depth in experiments (nm) | Experimental Storage Modulus (E') (GPa) | Experimental Tan δ |
|---|---|---|---|---|---|---|
| 1 | 100 | 16.8 | 0.063 | 111 | 28 ± 5 | 0.05 ± 0.02 |
|  | 200 | 26.8 | 0.052 | 236 | 39 ± 3 | 0.036 ± 0.008 |
|  | 400 | 38.7 | 0.036 | 442 | 43 ± 2$^a$ | 0.019 ± 0.002 |
| 10 | 100 | 23.0 | 0.040 | 111 | 30 ± 2 | 0.023 ± 0.006 |
|  | 200 | 34.7 | 0.025 | 236 | 40 ± 2 | 0.015 ± 0.005 |
|  | 400 | 38.5 | —$^b$ | 442 | 44 ± 3$^a$ | 0.015 ± 0.006 |
| 100 | 100 | 38.4 | 0.02 | 111 | 32 ± 2 | 0.022 ± 0.005 |
|  | 200 | 47.6 | 0.001 | 236 | 40 ± 3 | 0.014 ± 0.005 |
|  | †$^b$ | †$^b$ | †$^b$ | 442 | 45 ± 2$^a$ | 0.022 ± 0.006 |

$^a$Experimental results at 442 nm contact depth are tabulated from the approximate frequencies of 0.9, 7.7, 116.2 Hz, respectively.
†$^b$Excessive deformation in interface mesh.

In conclusion, biomimetic ex-vivo columnar nanocomposites provided by the present teachings, exemplified by (ZnO/LBL)$_n$, demonstrate that the conformal adsorption of flexible polymer chains on an inorganic phase provides both the mechanics and functional advantages of columnar architecture. Because natural enamel does not regenerate well in organisms, effective dissipation of vibration can considerably extend its longevity, which represents a distinct evolutionary advantage. The successful replication of columnar nanocomposites provided in accordance with the present disclosure opens a new dimension in the design of load bearing, vibration and aging-resistant, light materials. Optimization of the molecular scale tribology at soft-hard interfaces can also be used as a tool for acquiring combinations of properties that are otherwise antipodal. In this manner, such biomimetic composites are particularly suitable for use as vibration isolation coatings and components. As noted above, such light materials made from abundant inexpensive high VFOM components can be used in a variety of technological areas, including biomedical area (e.g., as implants), automotive, electronics, aircraft, construction, and other industries where long-term low-impact wear-resistance is advantageous.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A biomimetic composite comprising:
a plurality of nanostructures each having at least one axial geometry region comprising an inorganic material; and
a polymeric matrix comprising at least one polyelectrolyte disposed in void regions defined between respective nanostructures of the plurality of nanostructures, wherein the biomimetic composite exhibits a viscoelastic figure of merit (VFOM) of greater than or equal to about 0.001.

2. The biomimetic composite of claim 1, wherein the plurality of nanostructures comprises a plurality of substantially aligned axial geometry nanowires comprising zinc oxide.

3. The biomimetic composite of claim 2, wherein the plurality of substantially aligned axial geometry nanowires is substantially aligned in a vertical orientation with respect to a major plane of a substrate.

4. The biomimetic composite of claim 2, wherein each nanowire of the plurality of substantially aligned axial geometry nanowires has an average height of greater than or equal to about 100 nm to less than or equal to about 10 μm and an average diameter of greater than or equal to about 50 nm to less than or equal to about 600 nm.

5. The biomimetic composite of claim 1, wherein the plurality of nanostructures comprises a plurality of hedgehog-shaped microparticles each comprising a polymeric core region and a plurality of needles comprising zinc oxide that define the at least one axial geometry region.

6. The biomimetic composite of claim 1, wherein the polymeric matrix comprises one or more polyelectrolytes selected from the group consisting of: poly(allylamine), poly(acrylic acid), poly(diallyldimethylammonium chloride), polyethyleneimine, and polystyrene sulfonate.

7. The biomimetic composite of claim 1, wherein the polymeric matrix comprises at least two distinct polyelectrolytes.

8. A device incorporating the biomimetic composite of claim 1, wherein the biomimetic composite is used as a vibration isolation support component.

9. The biomimetic composite of claim 1 having a thickness of greater than or equal to about 1 micrometer (μm) to less than or equal to about 1 millimeter (m).

10. The biomimetic composite of claim 1 having a Young's modulus (E) greater than or equal to about 30 GPa and a storage modulus (E') greater than or equal to about 25 GPa.

11. A device incorporating the biomimetic composite of claim 1, wherein the device is selected from the group consisting of: a biomedical implant, a vehicle, an aircraft, an automobile, safety armor, a shield, a building component, an electronic device, a photonic device, an optic device, an optoelectronic device, a magnetooptic device, an energy storage device, an electronic sensor, a transducer, and combinations thereof.

12. A device incorporating the biomimetic composite of claim 1, wherein the device is selected from the group consisting of: a processor, a motherboard, a memory chip, a solid state-laser, on optical element, a beam steering device, a beam splitter, a diffraction grating, an interferometer, a photodetector, a secondary battery, a structural battery, a supercapacitor, a condensator, a memristor, a magnetooptical memory cell, a hard drive, a current sensor, a voltage sensor, an electroscope, an electron multiplier, a microelectromechanical (MEMS) based sensor, and a piezoelectric sensor.

13. A biomimetic composite comprising:
a plurality of hedgehog-shaped microparticles comprising a polymeric core region and a plurality of needles comprising zinc oxide oriented orthogonal to a surface of the polymeric core region; and
a polymeric matrix disposed in void regions defined between respective nanostructures of the plurality of nanostructures, wherein the biomimetic composite exhibits a viscoelastic figure of merit (VFOM) of greater than or equal to about 0.001.

* * * * *